(12) United States Patent
Tinker

(10) Patent No.: US 8,482,874 B2
(45) Date of Patent: Jul. 9, 2013

(54) PRESENTATION OF SHINGLED MAGNETIC RECORDING DEVICE TO A HOST DEVICE RESOURCE MANAGER

(75) Inventor: Joshua Bartholomew Tinker, Fort Collins, CO (US)

(73) Assignee: Seagate Technology LLC, Cupertino, CA (US)

( * ) Notice: Subject to any disclaimer, the term of this patent is extended or adjusted under 35 U.S.C. 154(b) by 232 days.

(21) Appl. No.: 13/114,226

(22) Filed: May 24, 2011

(65) Prior Publication Data

US 2012/0300333 A1    Nov. 29, 2012

(51) Int. Cl.
*G11B 5/02* (2006.01)

(52) U.S. Cl.
USPC ............................. 360/55; 703/24

(58) Field of Classification Search
None
See application file for complete search history.

(56) References Cited

U.S. PATENT DOCUMENTS

| | | | |
|---|---|---|---|
| 5,455,926 A * | 10/1995 | Keele et al. | 711/4 |
| 6,832,186 B1 * | 12/2004 | Margulieux | 703/24 |
| 2004/0085723 A1 * | 5/2004 | Hartung | 361/684 |
| 2008/0221859 A1 * | 9/2008 | Van Geel | 703/24 |
| 2009/0306956 A1 * | 12/2009 | Takahashi et al. | 703/24 |
| 2010/0205623 A1 | 8/2010 | Molaro et al. | |
| 2010/0232057 A1 | 9/2010 | Sanvido et al. | |

OTHER PUBLICATIONS

Wood et al., "The Feasibility of Magnetic Recording at 10 terabits Per Square Inch on Conventional Media", IEEE Transactions on Magnetics, vol. 45, No. 2, Feb. 2009, pp. 917-923.

* cited by examiner

*Primary Examiner* — Paul Huber
(74) *Attorney, Agent, or Firm* — Hollingsworth Davis, LLC

(57) ABSTRACT

A shingled magnetic recording hard drive is presented to a resource manager of a host device as an emulated device such as one or more optical media, an array of sequential access media, and/or write-once, read-many device. Data targeted for the emulated device is written to the shingled magnetic recording hard drive.

20 Claims, 7 Drawing Sheets

PRESENTATION OF SHINGLED MAGNETIC RECORDING DEVICE TO A HOST DEVICE RESOURCE MANAGER

SUMMARY

Embodiments described herein are generally directed to methods, systems, and apparatuses that facilitate presenting a shingled magnetic recording device to a host device resource manager. In one embodiment, a method involves presenting a shingled magnetic recording hard drive to a resource manager of a host device as one or more recordable optical media, and facilitating writing of data targeted for the one or more recordable optical media to the shingled magnetic recording hard drive. In another embodiment, a method involves presenting a shingled magnetic recording hard drive to a resource manager of a host device as an array of sequential access media, and facilitating writing of data targeted for at least a selected one of the sequential access media to the shingled magnetic recording hard drive. In another embodiment, an apparatus includes one or more processors having a) a hard disk drive interface operable to at least write to a shingled magnetic recording hard drive; and b) a host interface operable to emulate the shingled magnetic recording hard drive to a resource manager of the apparatus as one or more write-once, read-many media.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
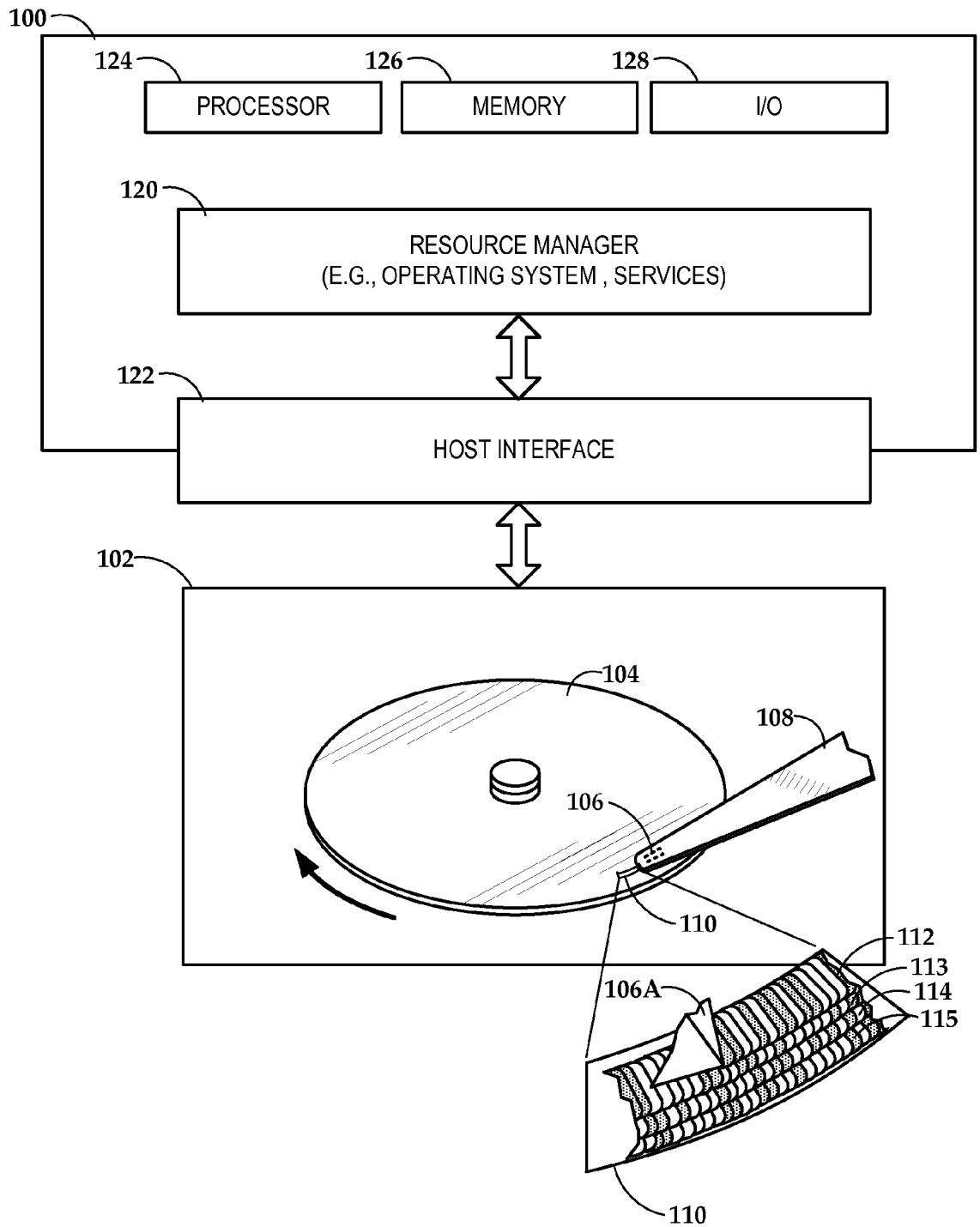
FIG. 1 is a block diagram illustrating an apparatus according to an example embodiment.

The present disclosure relates generally to techniques for presenting storage media via operating systems or equivalent software components. For example, a shingled magnetic recording (SMR) storage device (e.g., hard disk drive) may be represented to/from an operating system as one or more a legacy read/write devices. The legacy read/write devices may include an array of optical media, such as CD-R, DVD+R, DVD-R, etc. In such a case, the adaptations made for the array of optical media may alleviate performance concerns that may be associated with shingled storage devices.

Generally, SMR devices are hard disk drive (HDD) devices that utilize adapted recording techniques for increasing data storage density. In order to describe general aspects of SMR operation, FIG. 1 includes a block diagram that illustrates a host device 100 using an SMR hard drive 102 according to an example embodiment. The hard drive 102 includes a one or more magnetic disks 104 that store data through the application of localized magnetic fields to the disks 104. The magnetic fields are applied by a recording head which may be included in a slider 106 disposed on a pivoting arm 108. The slider 106 may also include a read head that senses the stored magnetic fields in the disk 104. As the disk 104 rotates, the arm 108 positions the slider 106 to read and write particular tracks of the media 104

In a conventional hard drive arrangement, the data is written in tracks that generally correspond to concentric circular rings on the disk. The tracks are further divided into sectors, which may represent the basic unit of storage on the drive. The sector may be shaped, for example, as a circular arc segment. An industry standard hard drive sector includes 512 bytes of user data, although other sector sizes can be defined under some conditions. A 512 byte physical sector can (and usually does) store more than 512 bytes of data, as the sector may store additional overhead data (e.g., error correction codes, identifier information) along with the user data.

The sector generally represents the smallest randomly accessible unit of storage on a conventional hard drive, and individual sectors may be read from, written to, and updated without necessarily affecting neighboring sectors. Because individual sectors can be independently read from and written to, a conventional hard drive exhibits relatively symmetrical performance between random read and write operations. This symmetry between random read and write performance has become the norm expected by end-users, and many uses of the hard drive (e.g., virtual memory) may depend on speedy random updates of stored data. However, in order to further increase data storage densities, future storage devices may utilize designs that change this symmetry between read and write performance.

It has been found that the thermal instability of magnetic grains in magnetic media is a limiting factor when trying to achieve densities that approach 500 Gb/in$^2$ or so. Some approaches, such as heat-assisted magnetic recording (HAMR) and bit patterned media (BPM), attempt to use (among other things) specially designed media to overcome these limitations. Alternate schemes attempt to increase storage densities using existing recording media by modifying the reading, writing, and signal processing of data stored on the media. One of these alternate schemes is known as "shingled writing" or shingled magnetic recording (SMR). This type of recording may also be referred to as high track density recording (HTDR) and/or banded recording.

An SMR drive uses a different arrangement of tracks than what is used in most conventional hard drives. The tracks (and the sectors therein) of conventional hard drives can be independently read from and written to. However, as the tracks widths are decreased in order to accommodate higher densities, effects such as adjacent track erasure become more problematic. For example, because of physical limitations in the write head, it may be difficult to generate a field that is both strong enough to write to the media and yet confined in a small enough space so as not to affect adjacent tracks.

One solution to this problem, as illustrated by way of example SMR device 102 in FIG. 1, is to layer, or "shingle," a set of tracks one over the other. The overlaying of tracks is shown in close-up view of area 110 of media 104. In area 110, a corner of write head 106A is shown writing a track portion 112. Different shading within the track portion 112 represents different magnetic orientations that correspond to different values of stored binary data. The track portion 112 is overlaid over part of track portion 113. Similarly, track portion 113 is overlaid over part of portion 114, portion 114 is overlaid over portion 115, etc.

The portions 112-115 may be part of what is referred to herein as a "super sector" or "vast sector," which may include hundreds or thousands of similarly overlapping, concentric portions 112-115. Gaps are created between vast sectors so that each vast sector can be updated independently of other vast sectors. It should be noted that the term "vast sector" is chosen because this region may be utilized in a similar way that a conventional sector is used (e.g., smallest independently writable unit), and is not necessarily related to the shape of the super/vast sector. The vast sector may generally be circular, and not a circular arc/section as a conventional sector.

By using overlapping concentric portions 112-115, the write head 106A can be adapted to generate high local fields without consideration of adjacent track erasure. As a result of these high fields, the data patterns may have more uniform vertical magnetic fields and can penetrate deeper into the medium. This allows a shingled-writing scheme to substantially increase data density compared to convention track writing schemes, even when using conventional magnetic media. The reading of the portions 112-115 may be performed analogously to a conventional hard drive, with sub-portions of the vast sectors being randomly accessed and read. However, the data may not be randomly written to or updated in a manner similar to a conventional hard drive.

As may be apparent from FIG. 1, this overlaying of successive track portions within a vast sector means that individual parts of the vast sectors may not be randomly updated on their own. The tracks are written in sequential concentric bands, and portions 112-115 cannot be updated without recovering/rewriting portions of subsequently written data. This gives rise to an asymmetry between random write and read performance of an SMR device. An SMR may have random read performance on par with a conventional hard drive under similar conditions, but SMR random writes may take longer compared to conventional hard drives that utilize separate, non-interfering tracks. This asymmetry may be negligible or non-existent for recording non-random, sequential data. Sequential write performance may approach, meet, or exceed that of conventional hard drives depending on the size of the sequentially written data.

While an SMR drive may perform similar to a conventional hard drive under some conditions, the performance may degrade for applications that require random updates of relatively small amounts of data. Analogous differences in read vs. write performance may be seen in other types of data storage devices and media. For example, writable optical media such as CD-R, CD-RW, DVD±R, DVD±RW, BD-R, BD-RE, etc., may exhibit asymmetry between read and write performance. Optical devices typically write data on the media in a spiral pattern from the inner diameter to the outer diameter. This generally involves writing blocks of data in sequence, and so may be sub-optimal for applications requiring random updates.

Optical media are generally used in applications where writes are less common, and write operations are expected to be more time consuming than reads. In such a case, optical device drivers/utilities don't generally allow random writing like a HDD. As a result, optical media is generally targeted for applications, data, and/or use cases where this read/write asymmetry is not a disadvantage. For example, archiving and backup may involve writing a collection of data files as a sequential stream, and so may be a good candidate for writing to optical media. Similarly, multimedia files such as images, sound, and video may often be large, sequential files that are written much less frequently than they are read, and so are often stored on optical media.

There is a resemblance between the read/write asymmetry of optical media and the read/write asymmetry of SMR devices. While a SMR device may have substantially better read/write performance than optical media devices in terms of write speed, latency, track access, etc., an SMR device may nonetheless exhibit slow random write performance when compared to a conventional hard drive. As a result, there may be resistance in adopting an SMR device as a drop-in replacement for hard drives to perform general-purpose computing tasks that involve, e.g., regularly making random changes to files. Instead, it may be preferable to utilize an SMR as a special-purpose storage device. For example, an SMR device may be presented to an operating system as an optical media device (e.g., an optical player or jukebox). In such a case, the adaptations made to compensate for the performance constraints of optical media could be advantageously applied to SMR devices. This could provide an optimal user experience for tasks for which both optical devices and SMR devices are ideally suited, and for which SMR devices could provide superior speed.

It will be appreciated that this concept of presenting an SMR device to an operating system may be extended to presenting the SMR device as any non-HDD device that is optimized for large, sequential writes. For example sequential access devices such as tape drives also occupy niches where their strengths (e.g., high sequential data transfer speeds, low cost) can be taken advantage of by substituting an SMR device in place of the sequential-read device. Generally, an SMR hard drive may also be presented to an operating system or equivalent thereof as a sequential access device, and/or an array of such devices.

In reference again to FIG. 1, the SMR hard drive device 102 is presented to a resource manager 120 of the host device 100 by way of a host interface 122. The term "resource manager" 120 is used broadly here, and may refer to any combination of operating system, kernel, drivers, applications, services, utilities, application program interfaces, etc., that act to provide a common layer of functionality for the host device 100. The interface 122 may operate with the SMR device 102 using existing or future data interface protocols (e.g., SATA, SCSI, SAS, USB, IEEE 1394, eSATA, etc.) and may present the device to the resource manager 120 as a different device, such as an optical media jukebox. The term "jukebox" as used herein may generally refer to any automated electro-mechanical device that manipulates (e.g., stores, queues, loads, unloads, plays, records, etc.) individual items of physical media on behalf of a media consuming device, such as a computer, consumer electronic device, etc.

The host device 100 may include any computing arrangement know in the art. Such computing devices may include at least one processor 124, which may include any combination of special purpose logic circuits and general purpose processors (e.g., central processing unit). The processor 124 generally interacts with memory 126 stores and provides access to instructions and data. An input/output subsystem 128 may include circuitry and software that enables the processor 124 in communication internally and externally with other devices, such as SMR device 102, user input devices, networks, etc. The resource manager 120, interface 122, and other functional components described hereinbelow may be embodied as hardware, firmware, and/or programs recorded on a non-transitory computer readable medium. The hardware, firmware, and/or programs may generally include instructions operable by at least the processor 124 for performing the described functions.

Figure 2:
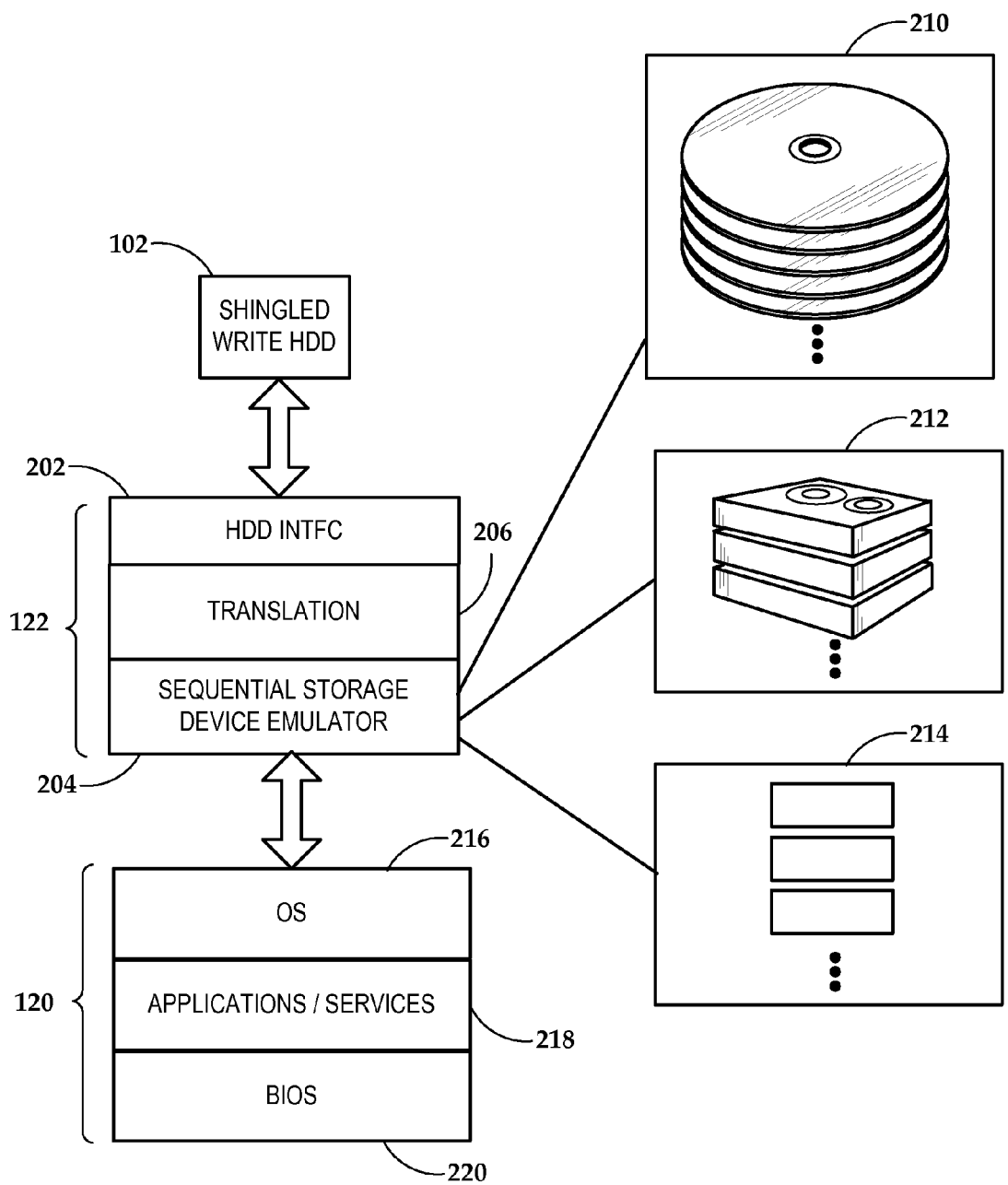
FIG. 2 is a block diagram illustrating details of an interface layer according to an example embodiment.

A more detailed view of interface 122 according to one example embodiment is shown in FIG. 2. Generally, interface 122 may be configured as an intermediary layer between the SMR device 102 and resource manager 120. The interface 122 may include a hard drive specific interface 202. The hard drive interface 202 may include standard and/or custom drivers, configurations, protocols, and services that enable interfacing with the SMR device 102. The hard drive interface 202 may be configured to efficiently interact with the SMR device 102, e.g., avoiding small random updates of data. In other cases, the operation of other parts of the interface 122 and/or the emulated device may make such optimizations unnecessary.

The interface 122 also includes an emulation layer 204 that presents the SMR device 102 via the resource manager 120 as a non-HDD device. This layer 204 may interact with an operating system (OS) 216, intermediary applications/services, and lower level firmware levels such as basic input-output system (BIOS) 220. The emulation layer 204 may operate at any level of the BIOS 220, OS 216, and/or applications/services 218. The emulation layer 204 may appear to the OS 216 or other firmware/software as a data interface to a hardware unit such as one or more optical devices 210, a tape autoloader 212, or any other write-once, read-many, non-HDD device, as indicated generally by reference 214.

The emulated devices 210, 212, 214 may be presented as a single media/device, and/or an autoloader array or library of media, similar to a jukebox. For example, the emulated device 210 may be presented as an array of writeable optical "discs" each the same size as a CD (640 MB or 700 MB), DVD (approximately 4 GB), BDs (40 to 50 GB), or any other size desired (assuming the resource manager 120 can handle custom media sizes). Total capacity may be the product of the emulated disk size times the number of "discs" in the library. So a 4TB SMR device 102 may be presented as a DVD autoloader jukebox with approximately 1,000 4 GB DVDs.

Writable optical media of the device 210 may be generally categorized as write-once and rewriteable, although write-once optical media may still support multiple writes (e.g., adding data to a disc that has free space). Similar to these types of optical devices, if a vast sector of an SMR device is partially written, data may later be added to the partially-written sector. The vast sector may also be completely re-written, analogous to the operation of a rewritable optical media. The emulated optical media of the device 210 and other media discussed elsewhere herein need not limited to any optical media/device type, and discussion of optical media may include any single- or multiple-write optical media known in the art. Similarly, the tape device 212 and other non-HDD device 214 may be used to represent any tape or other non-HDD media known in the art.

A translation layer 206 may be positioned between the emulation layer 204 and the HDD interface 202. The translation layer 206 may translate, for example, between different types of write and read requests used by SMR device 102 and emulated devices 210, 212, 214. This translation may include generating and/or changing control data and metadata associated with outer layers 202, 204 of the interface 122. The translation layer 206 may be able to interface with a number of emulated device types 210, 212, 214 and with a number of different HDD interfaces 202, e.g., by using generic interface functions that can be instantiated as needed to specific SMR interfaces 202 and emulator interfaces 204.

In the example above where DVD autoloader jukebox 210 is emulated, the resource manger 120 may write files sequentially to the interface 122 based on size of the emulated optical media. This write operation would target the jukebox 210, but would ultimately be written to the SMR device 102. Other features of a jukebox device 210 may also be emulated via the interface 122. For example, a jukebox may include two or more read/write units enabling reading/writing to two separate DVDs at the same time. This feature could be emulated by the interface 122, e.g., supporting operations such as parallel read/write streams to separate media targets.

It will be appreciated that presenting the device 102 as one or more legacy devices 210, 212, and 214, enables legacy software/services currently operable with the legacy devices to interact with the SMR device 102 without requiring any changes. Such legacy software/services may already be configured to avoid or minimize random writes. For example, the legacy software/services may already have features for grouping, queuing, and writing data in large, sequentially arranged data units. The interface layer 122 can assist in leveraging a large base of existing code that is already proven for the legacy devices 210, 212, 214, and yet can exhibit orders of magnitude increases in speed/performance without having to change the existing code.

Figure 3A:
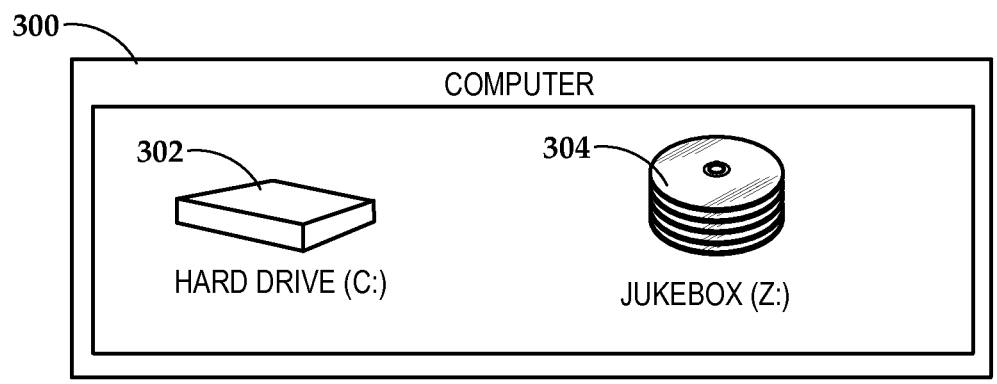
FIGS. 3A and 3B are block diagrams illustrating user interface views according to an example embodiment.

In reference now to FIG. 3A, a user interface screen 300 illustrates a use case according to an example embodiment. A user device (e.g., personal computer) includes a main hard drive that is shown via icon 302 as a conventional hard drive. The user device also has an SMR device installed, along with drivers and/or interface layers that make the SMR device appear as an optical media jukebox, as indicated as icon 304. By presenting the SMR device in this way, the expectations of the user can be managed so that sub-optimal uses of the SMR device (e.g., virtual memory swap space) can be prohibited by presenting the SMR device as a type of device where these sub-optimal uses are avoided by convention. Although the icon 304 shows the jukebox as a Windows™-style letter drive, other arrangements are possible. For example, the SMR may be presented as a special type of input-output jukebox device that has individual lettered drives (or some other OS-recognized identification scheme) contained within it.

There may be some situations where it is desirable to present at least part of the SMR device as an individual optical device with its own drive letter or other OS-appropriate file-system indicator. Generally, the individual optical drive may represent a lowest-common denominator format that is likely to work with any software developed within the last two decades. For example, some software may include copy protection that checks whether a copy of a purchased CD is mounted before the software will run. In order to speed up these checks and free up optical drives for other purposes, the SMR drivers/interface could include a copy of the CD and present it to the OS as an individual CD drive. Some provisions may need to be made in such a scenario that copy protection agreements and mechanisms are maintained, e.g., use of a registration server that allows one-time copying of the CD for this purpose.

Figure 3B:
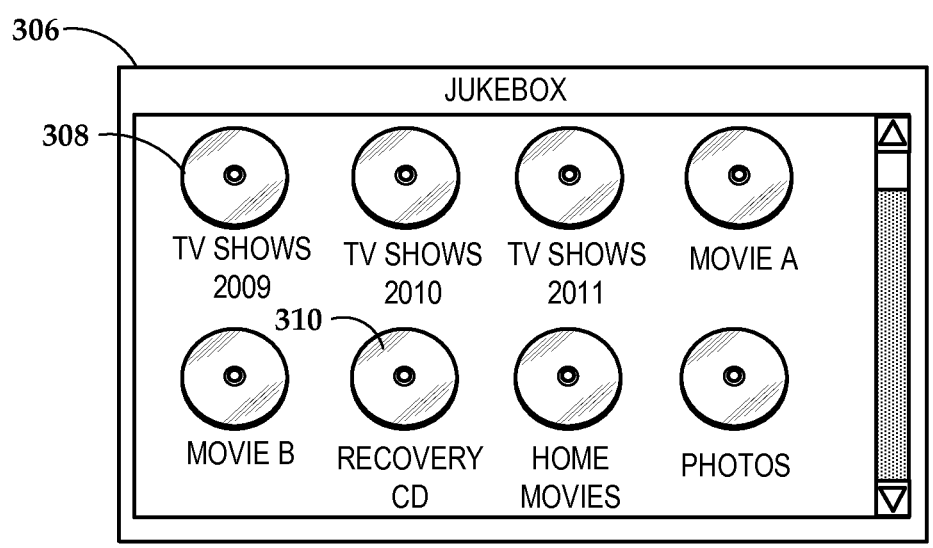

In FIG. 3B, a user interface screen 306 shows how the data within the SMR device may be presented as individual optical media objects. In this example, each icon (e.g., icon 308) may be represented via the operating system as an available CD/DVD/BD within a jukebox. Selection of the icon 308 may include simulating the actions of retrieving, spooling, and mounting/playing a physical disk, albeit occurring much faster than a physical spooler. Each virtual media 308 may include the same formatting and metadata as a physical media, which would easily enable burning the virtual media to a physical media if desired. This may also allow each virtual media object 308 to be easily exported into a common format (e.g., "iso" file) for easy creation of physical copies on optical media elsewhere.

The icons shown in screen 306 include labels that represent example legacy uses of optical media, including the storing of media such as TV shows, movies, music, and/or photos. Another use of optical media on a home computer is illustrated by icon 310, which is to store operating system images for install to and/or recovery of computers. In this latter case, the presentation of the SMR device as an optical media may also extend to lower level systems, such as BIOS. Through the use of hard drive partitioning, extensions to the BIOS, and/or special electro-physical coupling (e.g., connecting an SMR device using a cable especially configured for that purpose) some or all of the SMR device could be seen by the BIOS as a bootable device such as CD or DVD. In such a case, the user could easily perform OS reinstalls or use recovery tools in an install CD without having to search around for a physical media.

This use of an emulated optical device could be extended to multiple OSes, e.g., allowing booting from a number of "live" OS distributions that are self contained in a single CD or DVD. By presenting the SMR device as an optical media at a lower level (e.g., BIOS), these live OS distributions may be able to work without modification, treating the SMR drive as an optical media disc that the OS distribution expects to be running on. The SMR device could include a plurality of different live distributions in one place, allowing a user to select from any of them at boot time.

Figure 4A:
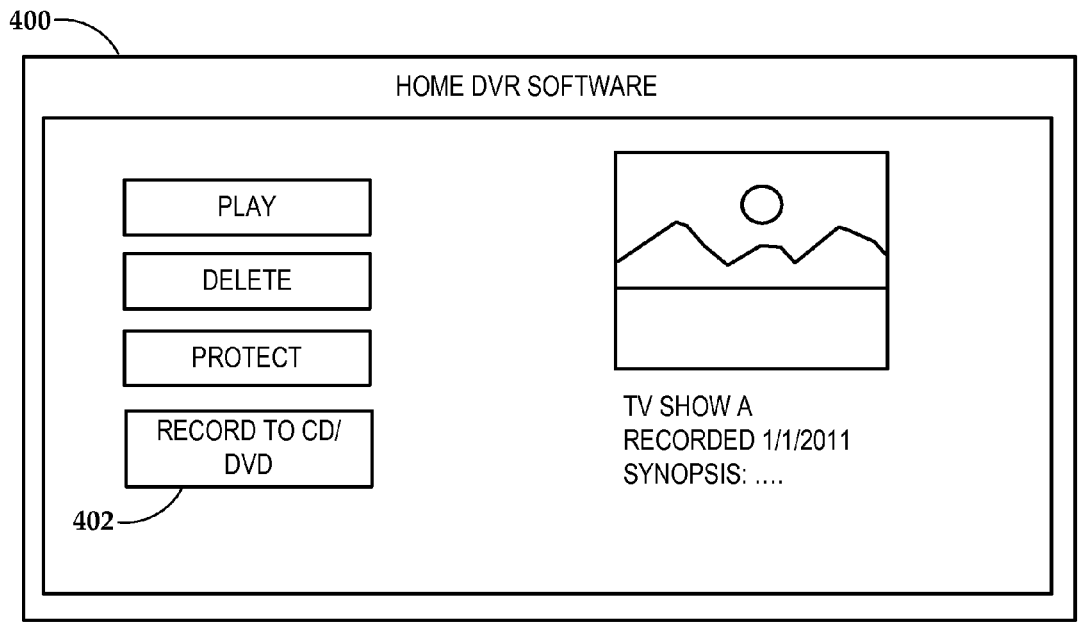
FIGS. 4A and 4B are block diagrams illustrating a home recording use case according to an example embodiment.

By presenting an SMR device as a legacy device (e.g., optical media, tape), legacy applications designed for the legacy device can seamlessly use the SMR device, and likely experience faster performance compared to the legacy device. This is shown by way of another example in the user interface screen 400 in FIG. 4A. This screen 400 represents a view that might be shown on a computer that is being used as a digital video recorder (DVR), e.g., in a home entertainment system. The DVR is a multimedia player/recorder that generally records media (e.g., TV shows) in a digital format on a hard drive for later playback. A particular show may be recorded to a primary hard drive, and accessed via screen 400 for later playback, deletion, etc.

Also shown in screen 400 is a control 402 that allows the user to record the show to an optical media (e.g., DVD). This control 402 may be used for a number of purposes, including building a home library of recorded shows and/or to free up space on the main hard drive. If the system includes an SMR device that is presented as one or more optical drives, then the selection of control 402 may facilitate recording the show to the SMR device without changes to the DVR software. In this way, a video library could be made to appear as being stored on a CD/DVD jukebox, yet without possible cost or speed penalties of such a device.

Figure 4B:
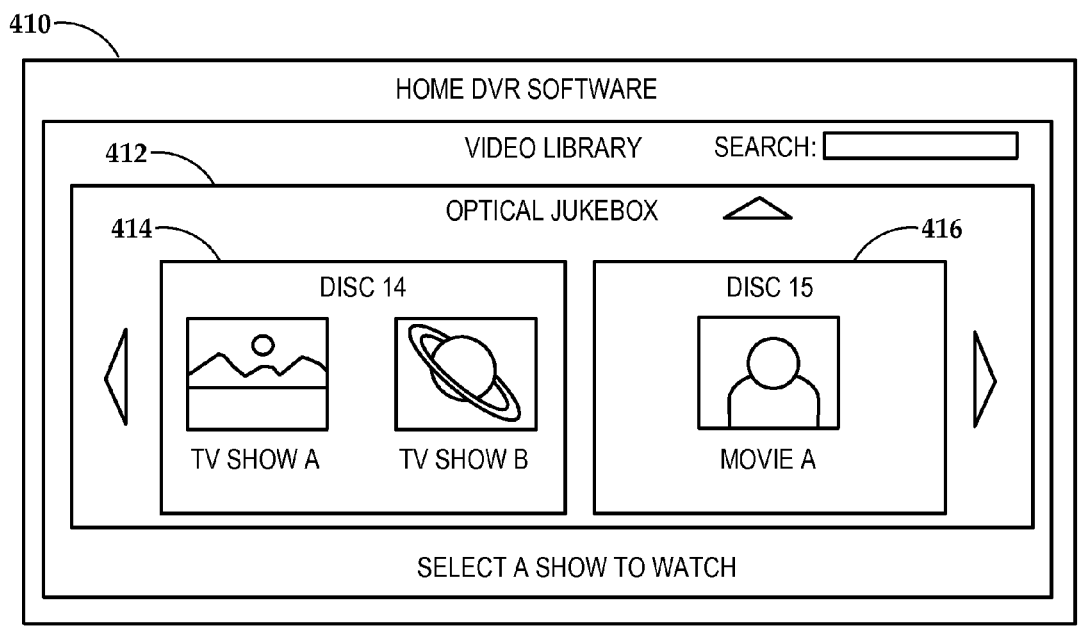

Other features of the DVR software may also seamlessly utilize the SMR device as if it were an optical jukebox. For example, screen 410 in FIG. 4B represents a browsing function of the DVR software according to an example embodiment. A user may use screen 410 to browse through a personal library of stored media. The SMR may be modeled as a jukebox (panel 412) that includes individual optical media for selection, as represented by way of example in panels 414 and 416. This presentation of SMR portions as individual optical discs of a jukebox may be a natural organization of content with which the user is already familiar, as well as being already supported in the DVR software.

Figure 5:
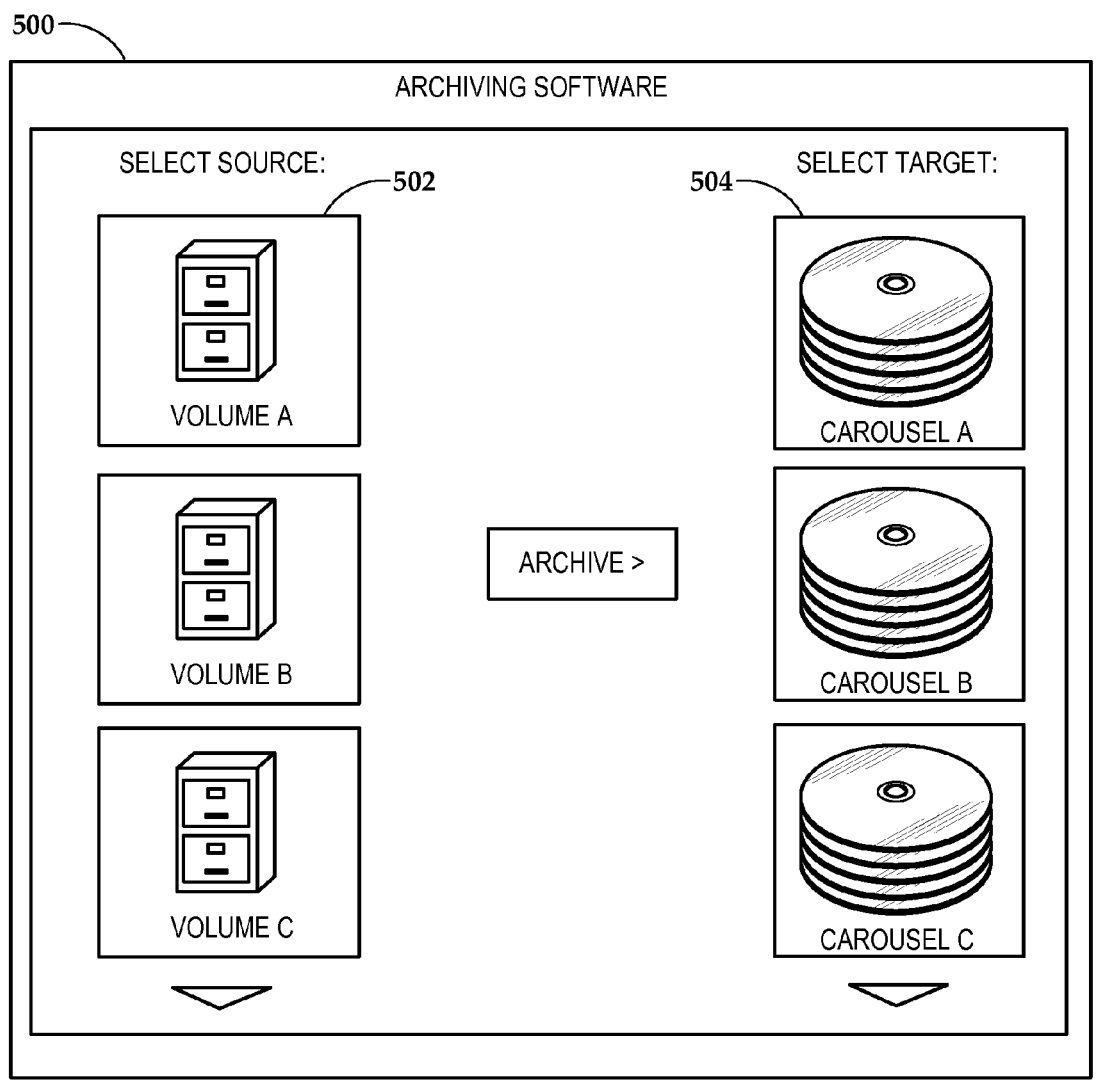
FIG. 5 is a user interface illustrating an archiving use case according to an example embodiment.

In reference now to FIG. 5, a user interface screen 500 illustrates an alternate example embodiment where an SMR device is presented as an optical jukebox. The screen 500 is a simplified view of an archiving utility that may be used for backing up data to a large array of optical devices. The hardware of such a system may be expanded by adding units (e.g., carousels) that each include a carrier for a collection of optical media and possibly an independent read/write unit. In this screen, a data volume (e.g., icon 502) may be assigned to a carousel (e.g., 504) for writing. In one scenario, the system may already have a number of carousels in use, but over time in may become less cost-effective to add carousels to further expand storage in view of the availability of inexpensive mass hard drive storage. Nonetheless the user may wish to use the hardware and software already paid for, as well as not having to go through the effort to configure and organize a new system.

In such a case, an SMR device may be presented to the software (e.g., via an OS layer) as a new carousel device. The SMR device may be able function alongside existing optical media carousels, yet provide advantages in terms of reduced cost, increased speed, and reduced use of floor space compared to an optical media. To an end user of interface 400 or the like, there need be no difference in the operation of the underlying software, nor would there need to be functional adaptations to the software for it to work with the SMR device. In the latter case, the emulation/presentation of the SMR device as an optical carousel may be performed at an operating system level (or other level described herein), thereby facilitating easy integration of the SMR device into existing archiving architectures.

Figure 6:
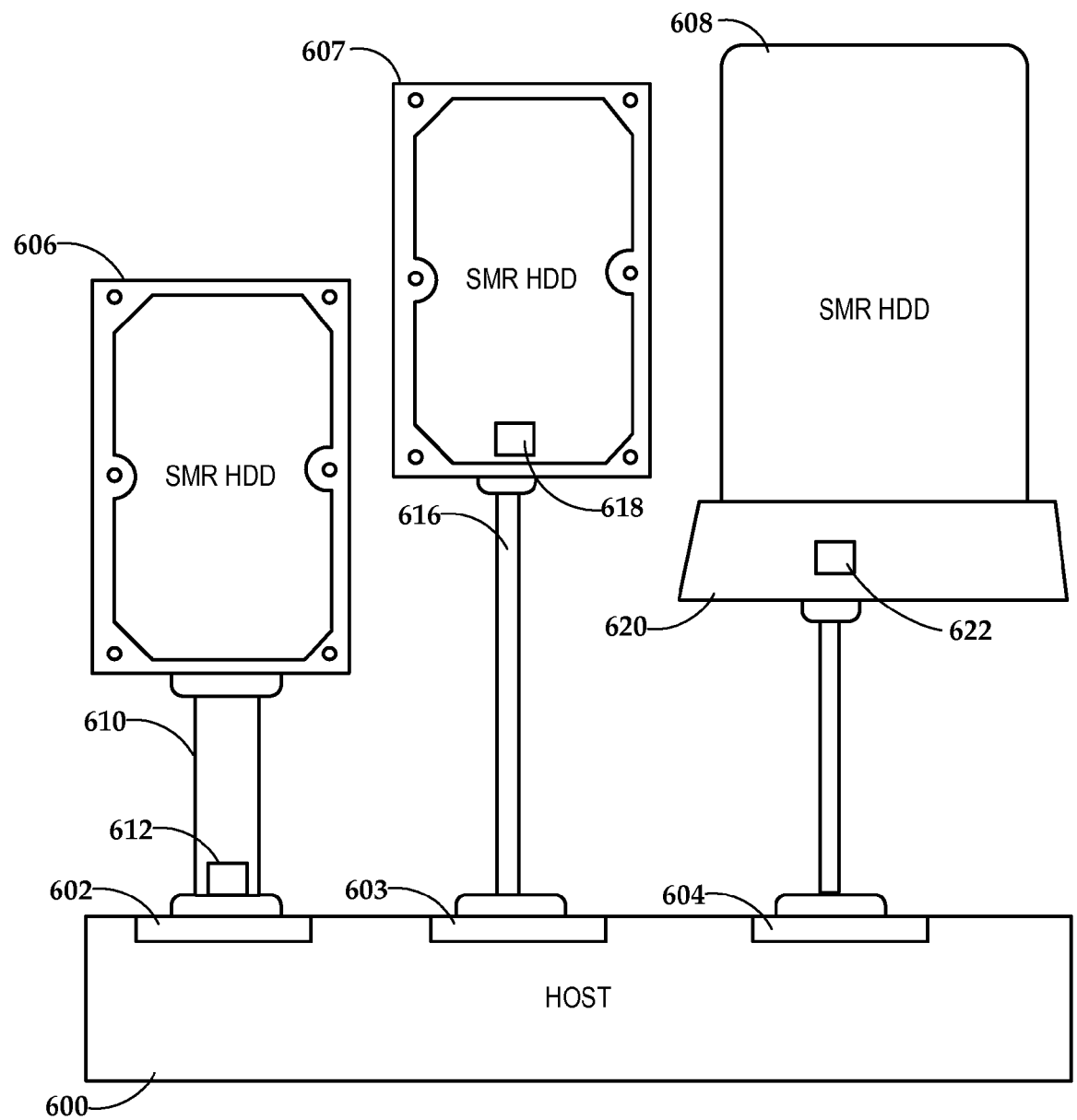
FIG. 6 is a block diagram illustrating alternate configurations of a host interface according to an example embodiment.

In other embodiments, the emulation/presentation of the SMR device may be performed by the SMR device itself, or by a peripheral interconnect or some other intermediary apparatus. Some examples of this type of apparatus are shown in FIG. 6. In FIG. 6, a host device 600 may include one or more standard internal/external data interfaces 602-604 such as IEEE 1394, USB, SATA, eSATA, SCSI, SAS, etc. Shingled magnetic hard drive devices 606-608 may connect to the host 600 and be presented as an alternate device (e.g., optical, tape drive) without requiring any hardware or software changes to the host 600, assuming that the host 600 is already capable of connecting to the emulated devices.

For example, the first SMR HDD 606 is coupled to the host 600 via a cable 610 that has an emulation module 612 embedded within. The module 612 may include any combination of active logic, passive circuitry, firmware, and software that enables presentation of the HDD 606 as any emulated device described herein. Among other things, the module 612 may present codes and/or initialization data that identify the HDD 606 to the host 600 as an emulated device. The module 612 may also facilitate altering read/write data formats and protocols if such data formats and protocols differ between the SMR HDD 606 and the emulated device. The cable 610 may be set to always perform this emulation functions, or may be configured to switch between emulated and native modes, e.g., via a switch, jumper, or command sent via host 600.

The second SMR HDD 607 is connected via a standard cable 616 to interface 603, and includes an onboard module 618 that enables presentation of the HDD 607 as any emulated device described herein. This onboard module 618 may, for example, be included in firmware of the HDD 607. The module 618 may present codes and/or initialization data that identify the HDD 607 to the host 600 as an emulated device. The module 618 may also facilitate altering read/write data formats and protocols if such data formats and protocols differ between the SMR HDD 607 and the emulated device. The module 618 may be enable to switch between an emulation or native mode, e.g., via external jumpers, switches, commands received via host interface 603, etc.

The third SMR HDD 608 interfaces with a dock 620, e.g., a hot-swap rack, tabletop dock, etc., that allows easily connecting and disconnecting the HDD 608. In this example, the dock 620 includes module 622 that may perform similar functions as described for modules 612 and 618. As was described with those modules 612, 618, module 622 may also be configurable to switch between emulation and native modes using switches, jumpers, commands, etc. The modules 612, 618, 622 may also be configured to automatically detect that the attached HDDs 606-608 are SMR devices, and automatically enable/disable emulation functions based on that determination.

Figure 7A:
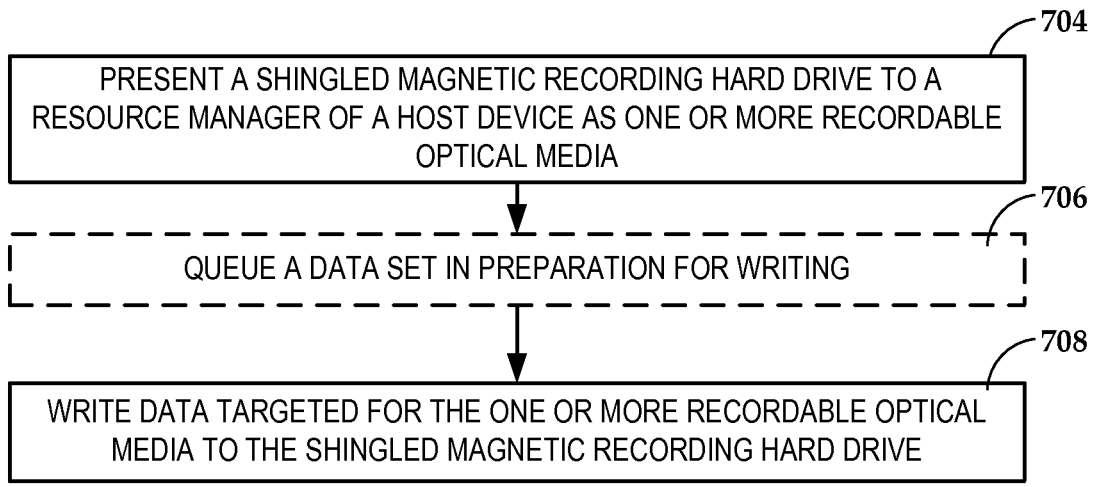
FIGS. 7A and 7B are flowcharts illustrating procedures according to example embodiments.

In reference now to FIG. 7A, a flowchart illustrates a procedure for presenting an SMR device as an optical media according to an example embodiment. A shingled magnetic recording hard drive is presented 704 via a resource manager of a host device as one or more recordable optical media. A data set may optionally be queued 706 in preparation for writing. Data targeted for the one or more recordable optical media is written 708 to the shingled magnetic recording hard drive.

Figure 7B:
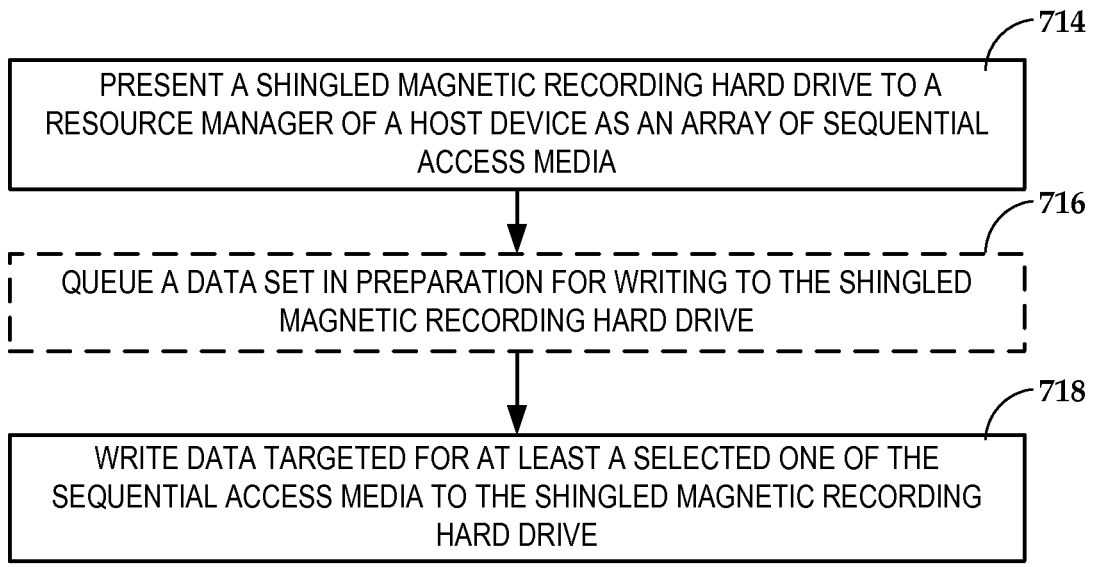

In reference now to FIG. 7B, a flowchart illustrates a procedure for presenting an SMR device as a sequential access media according to an example embodiment. A shingled magnetic recording hard drive is presented 714 via a resource manager of a host device as an array of sequential access media. A data set may optionally be queued 716 in preparation for writing. Data targeted for a selected one of the sequential access media is written 718 to the shingled magnetic recording hard drive.

The various embodiments described above may be implemented using circuitry and/or software modules that interact to provide particular results. One of skill in the computing arts can readily implement such described functionality, either at a modular level or as a whole, using knowledge generally known in the art. The structures and procedures shown above are only a representative example of embodiments that can be used to present SMR devices as described above. For example, the functions described occurring in a single computing device may be distributed over a large number of processing and network elements, and can be integrated with other services, such as network file services.

The foregoing description of the example embodiments has been presented for the purposes of illustration and description. It is not intended to be exhaustive or to limit the invention to the precise form disclosed. Many modifications and variations are possible in light of the above teaching. Any or all features of the disclosed embodiments can be applied individually or in any combination are not meant to be limiting, but purely illustrative. It is intended that the scope not be limited with this detailed description, but rather determined by the claims appended hereto.

What is claimed is:

1. A method comprising:
presenting a shingled magnetic recording hard drive to a resource manager of a host device as one or more recordable optical media; and
facilitating writing of data targeted for the one or more recordable optical media to the shingled magnetic recording hard drive.

2. The method of claim 1, wherein presenting the shingled magnetic recording hard drive via the resource manager comprises emulating the one or more recordable optical media.

3. The method of claim 1, wherein shingled magnetic hard drive device is presented as an optical media autoloader jukebox.

4. The method of claim 1, wherein writing data targeted to the shingled magnetic recording hard drive comprises:
queuing a data set in preparation for writing to the shingled magnetic recording hard drive; and
facilitating writing of the queued data set to the shingled magnetic recording hard drive.

5. The method of claim 1, wherein the resource manager comprises an operating system of the host device.

6. The method of claim 1, further comprising interacting with the shingled magnetic recording device via a legacy application configured to operate with the one or more optical media.

7. The method of claim 6, wherein the legacy application comprises one or more of a backup utility and a multimedia player.

8. The method of claim 1, wherein the data comprises multimedia data.

9. A non-transitory computer readable medium comprising instructions that cause an apparatus to perform the method of claim 1.

10. A method comprising:
presenting a shingled magnetic recording hard drive to a resource manager of a host device as an array of sequential access media; and
facilitating writing of data targeted for at least a selected one of the sequential access media to the shingled magnetic recording hard drive.

11. The method of claim 10, wherein presenting the shingled magnetic recording hard drive via the resource manager comprises emulating the array of sequential access media as a tape autoloader.

12. The method of claim 10, wherein writing data targeted to the shingled magnetic recording hard drive comprises:
queuing a data set in preparation for writing to the shingled magnetic recording hard drive; and
facilitating writing of the queued data set to the shingled magnetic recording hard drive.

13. The method of claim 10, wherein the resource manager comprises an operating system of the host device.

14. The method of claim 10, further comprising interacting with the shingled magnetic recording device via a legacy application configured to operate with the array of sequential access media.

15. The method of claim 10, wherein the data comprises multimedia data.

16. A non-transitory computer readable medium comprising instructions that cause an apparatus to perform the method of claim 10.

17. An apparatus comprising:
one or more processors comprising:
a hard disk drive interface operable to at least write to a shingled magnetic recording hard drive; and
a host interface operable to emulate the shingled magnetic recording hard drive to a resource manager of the apparatus as one or more write-once, read-many media, wherein at least one of the hard disk interface and host interface facilitates writing of data targeted for the one or more write-once, read-many media to the shingled magnetic recording hard drive.

18. The apparatus of claim 17, wherein the apparatus comprises a peripheral interconnect.

19. The apparatus of claim 17, wherein the shingled magnetic hard drive device is emulated as an optical media autoloader jukebox.

20. The apparatus of claim 17, wherein the shingled magnetic hard drive device is emulated as a tape autoloader.

* * * * *